United States Patent [19]

Shirasawa

[11] Patent Number: 4,802,380

[45] Date of Patent: Feb. 7, 1989

[54] HANDLE CONTROL FOR A SLOT MACHINE

[75] Inventor: Masaharu Shirasawa, Tochigi, Japan

[73] Assignee: Kabushiki Kaisha Universal, Tochigi, Japan

[21] Appl. No.: 91,498

[22] Filed: Aug. 31, 1987

[30] Foreign Application Priority Data

Aug. 29, 1986 [JP] Japan ................................ 61-203449

[51] Int. Cl.[4] ........................ G05G 1/04; F16D 41/04

[52] U.S. Cl. .................................. 74/523; 192/48.92; 192/48.9

[58] Field of Search ................. 74/519, 523, 524, 525, 74/528, 543, 545; 192/48.92, 48.6, 48.9

[56] References Cited

U.S. PATENT DOCUMENTS

| | | | |
|---|---|---|---|
| 2,924,317 | 2/1960 | Holstein | 192/48.92 |
| 3,563,353 | 2/1971 | Presti | 192/48.92 |
| 3,664,207 | 5/1972 | White | 192/48.92 |
| 3,743,067 | 7/1973 | Bokovoy | 192/48.92 |
| 3,895,701 | 7/1975 | Albertson et al. | 192/48.92 |
| 3,941,008 | 3/1976 | Cambria | 74/143 |
| 4,128,152 | 12/1978 | Tschursch | 192/48.92 |
| 4,241,534 | 12/1980 | Larson et al. | 192/48.92 |
| 4,254,577 | 3/1981 | Cheng | 192/48.92 |
| 4,436,192 | 3/1984 | Longrod | 192/48.92 |
| 4,503,724 | 3/1985 | Ward | 192/48.92 |
| 4,567,786 | 2/1986 | Sakurai | 74/523 |

FOREIGN PATENT DOCUMENTS

| | | | |
|---|---|---|---|
| 520751 | 1/1956 | Canada | 192/48.92 |
| 794732 | 5/1958 | United Kingdom | 192/48.92 |
| 1232899 | 5/1971 | United Kingdom | 192/48.92 |

*Primary Examiner*—Richard E. Moore
*Assistant Examiner*—Vinh Luong
*Attorney, Agent, or Firm*—Young & Thompson

[57] ABSTRACT

A handle control device for a slot machine in which a handle is operated to start a game, includes a rotatable wheel supported on a fixed shaft for rotation with the handle. Unidirectionally but oppositely rotatable clutch wheels are mounted on the fixed shaft and disposed on opposite sides of the rotatable wheel. An interconnecting member is moved in one or another direction according to the positions of the handle so as selectively to interconnect the rotatable wheel to one or the other of the clutch wheels.

3 Claims, 4 Drawing Sheets

HANDLE CONTROL FOR A SLOT MACHINE

BACKGROUND OF THE INVENTION

The present invention relates to an operating handle control device for controlling the operation of a handle of a slot machine.

Slot machines are generally provided with an operating handle control device for controlling the operation of a handle with its associated elements to start the reels of the slot machine. Such a device has a mechanism for restricting the operation of the operating handle in such a way as to prevent the operating handle, once operated, from restarting the machine upon its return to its initial position and/or to prevent the operating handle from being reoperated until the operating handle returns to the initial position.

For effecting this restriction of the operating handle, various actuating devices having restricting mechanisms are known in the art. One such operating handle control device, disclosed in, for example, Japanese utility model unexanined publication No. 59-22,188 and Japanese utility model publication No. 61-21,089, is provided with a restricting mechanism comprising a ratchet wheel provided integrally with, or cooperating with, the operating handle, and a ratchet engageable with the ratchet wheel.

Due to the provision of the ratchet and ratchet wheel, this operating handle control device not only has an increased number of parts but also is complicated in construction. Furthermore, the restricted mechanisms are liable to malfunction when the ratchet and ratchet wheel are engaged with and disengaged from each other, resulting in an improper operation.

Moreover, because the ratchet frequently engages with and disengages from the ratchet wheel, the ratchet and ratchet wheel are liable to wear and develop play.

OBJECTS OF THE INVENTION

It is, therefore, an object of the invention to provide an operating handle control device for an amusement machine which is simple in construction.

It is another object of the present invention to provide an operating handle control device for an amusement machine which is durable.

SUMMARY OF THE INVENTION

According to the present invention, the operating handle control device for a slot machine comprises a rotatable wheel cooperating with the operating handle and a pair of rotatable clutch wheels coaxially mounted on opposite sides of the rotatable wheel. The two clutch wheels are rotatable unidirectionally but oppositely to each other. An interconnecting means is provided between the rotatable wheel and the clutch wheels so as to selectively operationally interconnect the rotatable wheel and either one of the clutch wheels. Due to the provision of the unidirectionally but oppositely rotatable clutch wheels, the rotatable wheel is restricted to rotate according to the operated positions of the operating handle, thereby restricting the operating direction of the operating handle.

According to a feature of a preferred embodiment of the present invention, structure associated with the operating handle control device can be disposed around the shaft of the rotatable wheel. Due to such a disposition of the associated structure, the operating handle control device can be made not only compact in construction but also with a decreased number of parts in comparison with conventional slot machine operating handle control devices which comprise basically a ratchet and a ratchet wheel. Due to the decreased number of parts and the compact construction, the operating handle control device of the present invention is improved in reliability and durability.

DETAILED DESCRIPTION OF THE INVENTION

The following description is directed to a slot machine in which the present invention is embodied. The slot machine and its actuating device incorporate various elements. Because such elements are well known to those skilled in the art, this description will be directed in particular to elements forming part of, or cooperating directly with, the actuating device embodying the present invention. It is to be understood that the actuating device itself can be applicable to any of various amusement machines having an operating handle well known to those skilled in the art.

Figure 1:
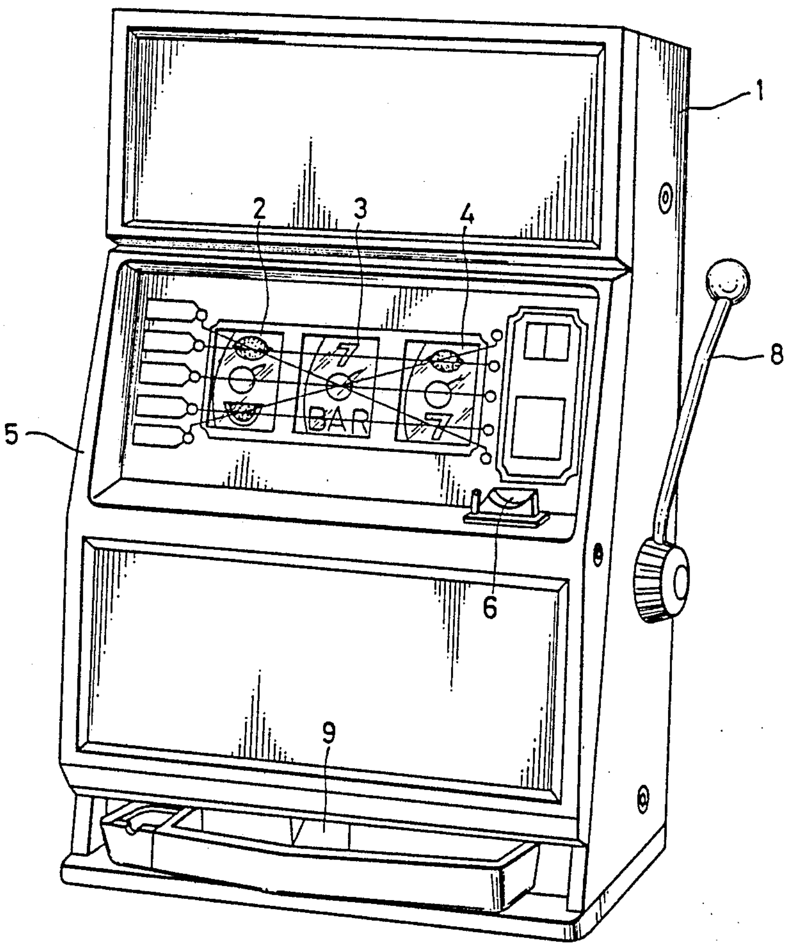
FIG. 1 is a perspective view of a slot machine embodying the present invention.

Referring now to the drawings in greater detail, wherein like reference numerals denote the same or similar elements or parts throughout the several views, FIG. 1 shows a slot machine embodying the present invention. The slot machine 1 has three reels 2 to 4 mounted individually rotatably on a shaft, each reel having an annular series of various symbols such as pictures of cherries, lemons or characters or numbers, or the like on the peripheral surface thereof at regular intervals. These reels 2 to 4 are caused to rotate simultaneously by manipulation of an operating handle 8 provided on a side of the slot machine 1 only after insertion of, for example, one to three coins or tokens through a coin slot 6. Upon the respective reels 2 to 4 stopping during each game, symbols on the reels 2 to 4 in stopped position are visible through windows provided in a front surface of the slot machine.

Specifically, when coins are inserted into the slot machine through the coin slot 6, a retaining mechanism which retains the operating handle 8 in an initial position shown in FIG. 1 is caused to release the operating handle 8. Then the operating handle 8 is fully pulled to start motors for the respective reels 2 to 4 simultaneously so as to rotate the reels 2 to 4; and a game is played. According to stop signals generated by a random timer, the reels 2 to 4 stop to display symbols in the windows. The slot machine detects the stopped positions of the respective reels 2 to 4, thereby to determine whether a predetermined prize-winning combination of symbols has occurred on a specified winning line or lines, and if in fact there has occurred any prize-winning combination of symbols, to cause a payment of coins or token in accordance with the type of combinations, into a coin saucer 9.

Figure 2:
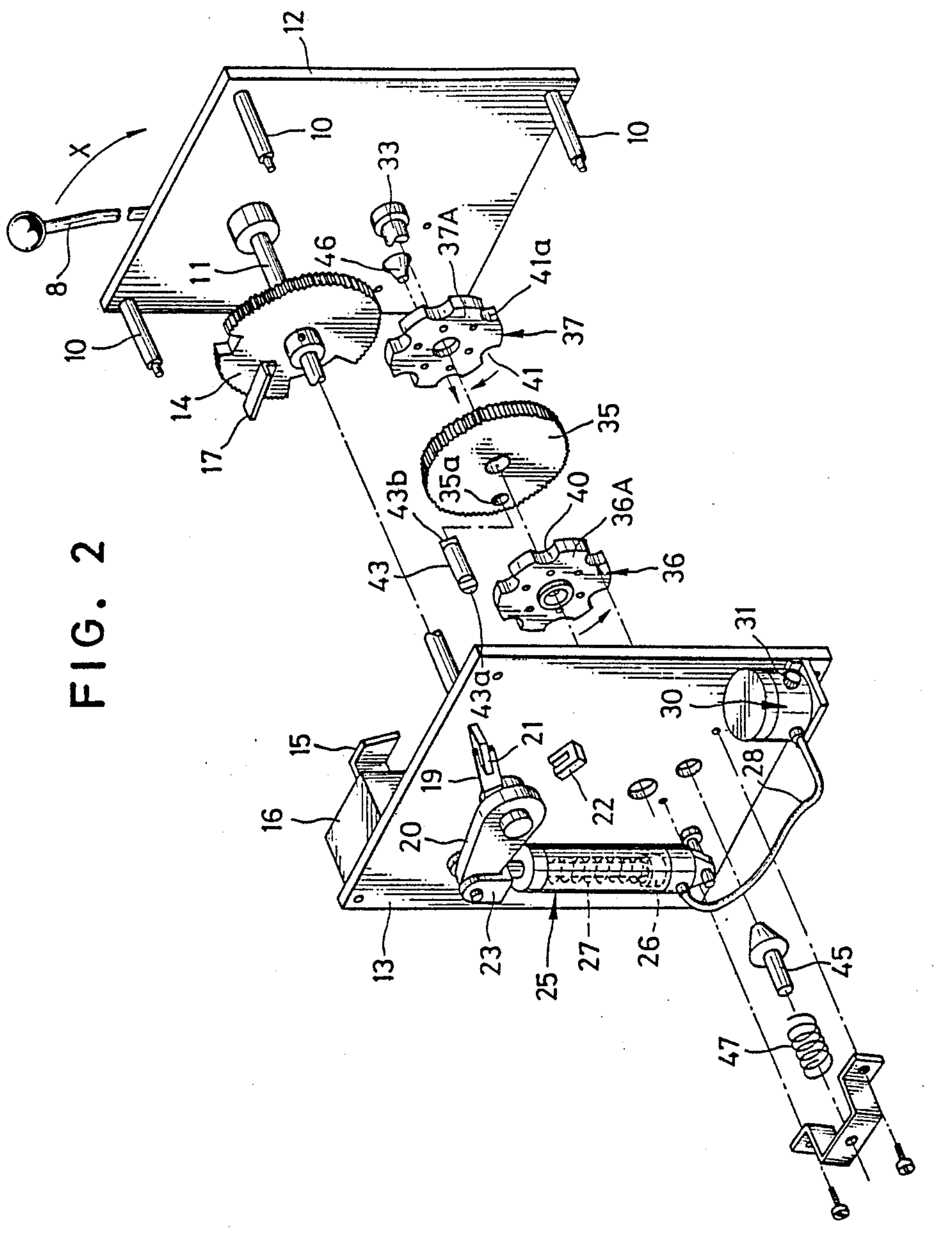
FIG. 2 is an exploded perspective view of the operating handle control device of the present invention.

Referring to FIG. 2 showing the operating handle control device of an embodiment according to the present invention, there is a base plate 12 which is fixed to the inside of the side wall of the housing of the slot machine 1. Attached to the base plate 12 by four struts 10 is a side plate 13 on which various elements are mounted. A shaft 11 to which the operating handle 8 is fixed at its outer end is supported for rotation between the base and side plates 11 and 13. Fixed to the shaft 11 is a driving gear 14 provided with a lug 17 engageable with a hook 15 of a retaining means 16 mounted on the side plate 13. The retaining means 16 is actuated to operate when a coin or coins are inserted into the slot machine 1. Therefore, if no coin has been inserted into the slot machine 1, the hook 15 is maintained in engagement with the lug 17 so as to prevent the driving gear 14 from being rotated by the operating handle 8. This means that the operating handle 8 is maintained in its original position shown in FIG. 2 until a coin is inserted into the slot machine 2.

The shaft 11 has an inner end extending inside the side plate 13 and attached to a light-opaque member 19 and an arm 20. A pair of photointerrupters 21 and 22 on the side plate 13 are disposed to be interrupted by the light-opaque member 19 when the shaft rotates. Specifically, the light-opaque member 19 interrupts the photointerrupter 21 when the operating handle 8 is in the initial position and the photointerrupter 22 when the operating handle is pulled in a direction shown by an arrow X in FIG. 2 to a predetermined angular position wherein the reels 2 to 4 are started to rotate.

To a free end of the arm 20, a piston rod 26 of an air cylinder 25 is attached through a crank arm 23. This piston rod 26 is urged downwardly by a coil spring 27 in the cylinder 25 so as to urge the shaft 11 to rotate in the counterclockwise direction, thereby returning the operating handle 8 to the initial position. A regulating unit 30 cooperates with the air cylinder 25 through a tube 28 to control air flow into and from the air cylinder 25, thereby causing the piston rod 26 to retract slowly and smoothly. For adjusting the speed of movement of the piston rod 26, there is a screw 31 which is turned to regulate a needle valve which is well known in the art and so is omitted from FIG. 2.

The base plate 12 is provided with a fixed pivot 33 on which is mounted a driven gear 35 in mesh with the driving gear 14. On opposite sides of the driven gear 35, one-way clutches 36 and 37 are mounted for rotation on the pivot 33. These one-way clutches 36 and 37 are rotatable only in directions opposite to each other.

Figure 3:
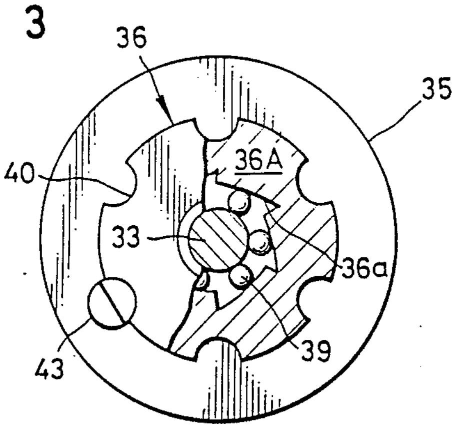
FIG. 3 is a partly cross sectional view of the essential parts of a one-way clutch incorporated in the actuating device of FIG. 2.

As is shown in greater detail in FIG. 3, the clutch 36 comprises an annular clutch wheel 36A having a plurality of jaw grooves **36*a* formed in its inner surface and a plurality of clutch balls 39 disposed one between each jaw groove and the pivot 33. Due to the jaw groove - clutch ball construction, the clutch wheel 36A is allowed to rotate in the counterclockwise direction but is prevented from rotating in the clockwise direction as viewed in FIG. 3. On the other hand, the one-way clutch 37 is constructed in the same way as the one-way clutch 36 but allows the clutch wheel 37A to rotate only in the clockwise direction as viewed in FIG. 3**. It is to be understood that the one-way clutch itself may take any of various forms well known to those skilled in the art and already commercially available.

Each clutch wheel 36A, 37A is formed with a semicircular groove 40, 41 every 60 degrees on the periphery thereof, namely six grooves in total in this embodiment. However, it is to be understood that the number of the semicircular grooves is not limited to six so long as it is at least three.

Referring to FIGS. 2 and 3, the driven gear 35 is formed with a hole **35*a* in which a shift pin 43 is supported for sliding movement. Each end of the shift pin 43 has an extension 43*a*, 43*b* which has a semi-circular cross section with the same diameter as that of the semicircular groove 40, 41 of each clutch wheel and a length at least the thickness of the clutch wheel 36A, 37A of each one-way clutch 36, 37**.

Figure 5:
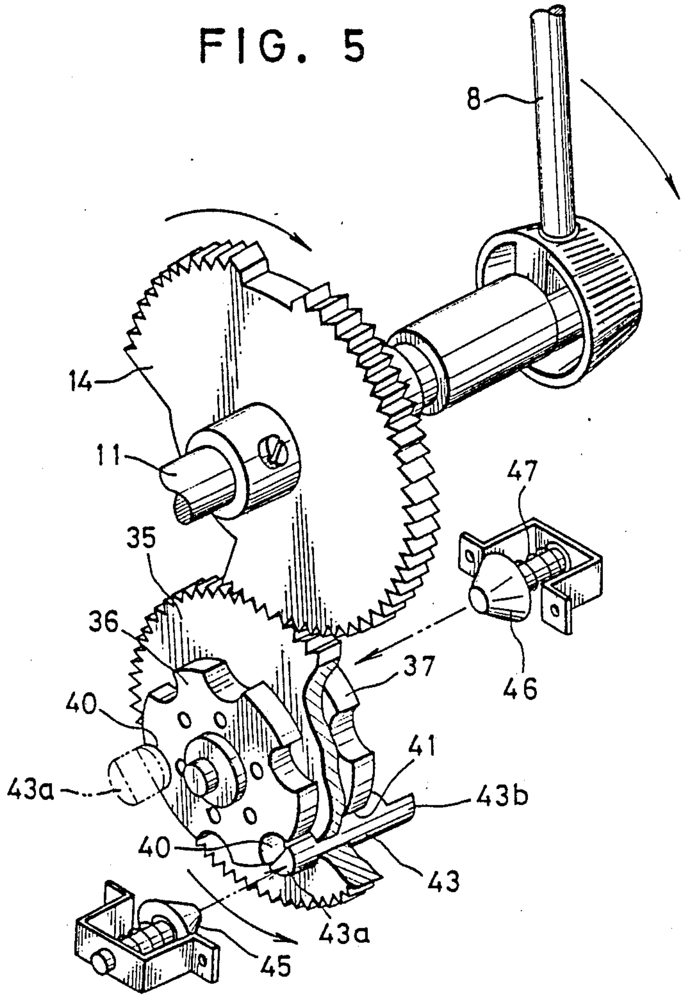
FIG. 5 is a perspective illustration, with parts broken away, showing the operation of the essential parts of the operating handle control device of FIG. 1.

On each plate 12, 13, there is a frustoconical spindle pin 45, 46 urged by a coil spring 47. These frustoconical spindle pins 45 and 46 are disposed at the same distance from the fixed pivot 33 but are shifted in angular position by a predetermined angle, for example 120 degrees in this embodiment. The frustoconical spindle pin 46 is so positioned as to bear against the end of the extension **43*b* of the shift pin 43 when the operating handle is in the initial position, forcing the extension 43*b* of the shift pin 43 out of the semi-circular groove 41 of the clutch wheel 37A of the one-way clutch 37, thereby to disconnect the operational coupling between the driven gear 35 and the clutch wheel 37. Simultaneously, the opposite extension 43*a* of the shift pin 43 is brought into engagement in the semi-circular groove 40 of the clutch wheel 36A of the one-way clutch 36 so as to operationally couple the clutch wheel 36 to the drive gear 35 through the shift pin 43, as is clearly shown by a double-dotted line in FIG. 5**.

In the operation of the slot machine in which the present invention is embodied, when one or more coins are inserted into the slot machine 1 of which the operating handle 8 is in its initial position shown in FIGS. 1 and 2, the retaining means 16 is actuated to release the hook 15 from the lug member 17 of the driving gear 14. As a result, since the driving gear 14 is enabled to rotate, the operating handle 8 is made operable. When the operating handle 8 is pulled in the direction shown by the arrow X, the driven gear 35 is rotated in the counterclockwise direction through the driving gear 14. Because the driven gear 35 is, by the shift pin 43, coupled to the clutch wheel 36A of the one-way clutch 36 on which can rotate only in the counterclockwise direction, the driven gear 35 and the one-way clutch 36 rotate in the counterclockwise direction as a unit while leaving the one-way clutch 37 disconnected from the driven gear 35. When pulling the operating handle 8 in the direction shown in the arrow X, the driven gear 35 is prevented from clockwise rotation by means of the one-way clutch 36, so as to prevent the operating handle 8 from being reversed. Due to the rotation of the shaft 11 which is caused by the driven gear 14, the arm 20 is turned in the clockwise direction to pull up the piston rod 26 while compressing the coil spring 27. As a result, air flows into the air cylinder 25 through the regulating unit 30. At this time, as only a small air flow resistance is offered, the operating handle 8 is not subjected to an increased operation force.

Figure 4:
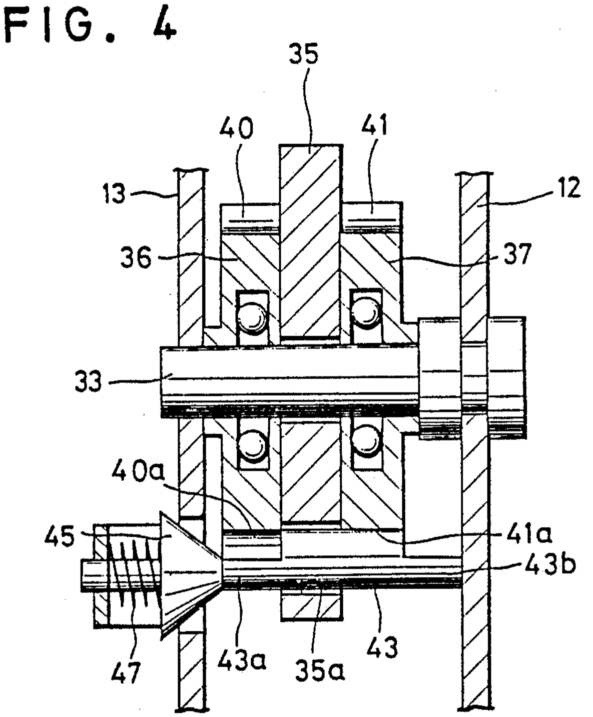
FIG. 4 is a cross sectional view of the essential parts of the operating handle control device of FIG. 2.

When the driven gear 35 is turned through approximately 120 degrees by the operation of the operating handle 8, the end **43*a* of the shift pin 43 is contacted by the spindle pin 45 mounted on the side plate 13 so as to shift the shift pin 43 in the right-hand direction viewed in FIG. 4 when the semi-circular grooves 40 and 41** of the respective clutch wheels 36A and 37A are brought into alignment with each other. As a result, the shift piin 43 at its left end as seen in FIG. 4 leaves the semi-circular groove 40 and at its right end enters the semi-circular groove 41 so as to couple the driven gear 35 to the one-way clutch 37. Simultaneously, the photointerrupter 22 is interrupted by the light-opaque member 19 that turns as a unit with the shaft 11 to detect the operating handle 8 having been pulled by the predetermined amount of angular movement in the direction shown by the arrow X and to output a signal which in turn is transmitted to the motors for the respective reels 2 to 4. Consequently, the reels 2 to 4 start to rotate simultaneously.

It is to be noted that the shift pin 43 is caused to move quickly by the coil spring 47 so as to hit the side surface of the base plate 12 with its projection 43*b*, producing a shock sound when the shift pin 43 is shifted to the position shown in FIG. 4. Slot machines which are provided with motor-driven reels are often provided with a sounding device in order to excite the interest of the players. For this purpose, the slot machine embodying the present invention avoids the need for the provision of a separate sounding device.

The clutch wheel 37A of the one-way clutch 37 rotates only in the clockwise direction about the fixed shaft 33 and is prevented from rotating in the reverse direction. Therefore, after the driven gear 35 has been operationally coupled to the one-way clutch 37 through the shift pin 43, the driven gear 35 is prevented from rotating in the counterclockwise direction, allowing the operating handle 8 to turn only in the direction to return to the initial position. Consequently, even if the operating handle 8 is stopped in the course of returning to the initial position, the operating handle 8 cannot be again pulled in the direction shown by the arrow X.

The coil spring 27 inside the air cylinder 25 urges the piston rod 26 in a direction wherein the operating handle 8 is urged to move to the initial position. Therefore, if the operating handle 8 is released only after having been fully pulled, the operating handle automatically returns to the initial position. At this time, the air flow into the air cylinder 25 is so controlled as to retard the movement of the operating handle 8.

Upon clockwise rotation of the driven gear 35, the driving gear 14 rotates in the counterclockwise direction. When the operating handle 8 fully returns to the initial position, the spindle 46 presses the end 43*b* of the shift pin 43 to the left as viewed in FIG. 4. Consequently, the fully cylindrical section of the shift pin 43 is disconnected from the semi-circular groove 41 of the clutch wheel 37A of the one-way clutch 37 and, on the other hand, inserted into the semi-circular groove 40 of the clutch wheel of the one-way clutch 36. As a result, the driven gear 35 is disconnected from the one-way clutch 37 and operationally coupled to the one-way clutch 36. At this time, the lug member 17 of the driving gear 14 has ridden over the hook 15 and the retaining means 16 prevents the operating handle 8 from being pulled again. Meanwhile, the photointerrupter 21 is interrupted by the light-opaque member 19 to detect the return of the operating handle to the initial position. Corresponding to this detection of the return of the operating handle 8 to the initial position, a game sequence program for a reel stop operation, a winning combination judgement, and so on are executed in a well-known manner.

In the above-described embodiment, as the shift pin 43 is shifted once every 120-degree turn of the driven gear, it suffices to provide three grooves at equal angular distances on the periphery of each one-way clutch 36, 37. Nevertheless if six grooves are provided at equal angular distances on the periphery of each one-way clutch, the angle through which the operating handle 8 is operated to start the rotation of the reels can be changed stepwise by increments of 60 degrees merely by changing the location of the spindle pins 45 and 46.

What is claimed is:

1. An operating handle control device in combination with a slot machine having an operating handle which is swung from its initial position to a starting position for starting a game, the operating control device comprising:

a rotatable wheel supported by a fixed shaft for rotation by said operating handle;

a pair of clutch wheels mounted on said fixed shaft on opposite sides of said rotatable wheel, said clutch wheels being rotatable unidirectionally but oppositely to each other;

longitudinally displaceable interconnecting means for selectively interconnecting said rotatable wheel with one of said pair of clutch wheels; and actuating means for moving said interconnecting means in opposite directions when said operating handle is swung to said initial position and to said starting position, thereby causing said interconnecting means to perform said selective interconnection.

2. An operating handle control device for a slot machine having an operating handle which is swung from its initial position to a starting position for starting a game, the operating handle control device comprising:

a rotatable wheel supported by a fixed shaft for rotation by said operating handle;

a pair of clutch wheels mounted on said fixed shaft on opposite sides of said rotatable wheel, said clutch wheels being rotatable unidirectionally but oppositely to each other;

interconnecting means for selectively interconnecting said rotatable wheel with one of said pair of clutch wheels, said interconnecting means comprising a pin slidable lengthwise in a bore in said rotatable wheel; and actuating means for moving said pin in opposite directions when said operating handle is swung to said initial position and to said starting position, thereby causing said pin to perform said selective interconnection.

3. An operating handle control device as defined in claim 2, and further comprising fixed solid abutment means against which said pin makes a shock sound when moved by said actuating means.

* * * * *